US012644967B2

(12) United States Patent
O'Donnell

(10) Patent No.: US 12,644,967 B2
(45) Date of Patent: Jun. 2, 2026

(54) INTERCHANGEABLE LENS SYSTEMS

(71) Applicant: Motional AD LLC, Boston, MA (US)

(72) Inventor: Timothy O'Donnell, Waltham, MA (US)

(73) Assignee: Motional AD LLC, Boston, MA (US)

( * ) Notice: Subject to any disclaimer, the term of this patent is extended or adjusted under 35 U.S.C. 154(b) by 400 days.

(21) Appl. No.: 18/167,931

(22) Filed: Feb. 13, 2023

(65) Prior Publication Data

US 2023/0296730 A1 Sep. 21, 2023

Related U.S. Application Data

(60) Provisional application No. 63/310,426, filed on Feb. 15, 2022.

(51) Int. Cl.
| | |
|---|---|
| *G01S 7/481* | (2006.01) |
| *G01S 17/931* | (2020.01) |
| *G02B 7/02* | (2021.01) |

(52) U.S. Cl.
CPC .......... *G01S 7/4816* (2013.01); *G01S 17/931* (2020.01); *G02B 7/022* (2013.01)

(58) Field of Classification Search
CPC ..... G02B 27/0006; G02B 7/022; H04N 23/51
See application file for complete search history.

(56) References Cited

U.S. PATENT DOCUMENTS

| | | | |
|---|---|---|---|
| 9,749,507 B1 * | 8/2017 | Sandstrom | G03B 17/08 |
| RE46,672 E * | 1/2018 | Hall | G01S 7/4813 |

| | | | |
|---|---|---|---|
| 2016/0246064 A1 | 8/2016 | Kashima | |
| 2016/0264064 A1 * | 9/2016 | Byrne | B60S 1/52 |
| 2017/0242101 A1 | 8/2017 | Oh | |
| 2019/0179028 A1 * | 6/2019 | Pacala | H05K 1/0274 |
| 2020/0406274 A1 * | 12/2020 | Schulz-Weiling | B08B 13/00 |
| 2021/0025984 A1 | 1/2021 | Schultz et al. | |

(Continued)

FOREIGN PATENT DOCUMENTS

| | | |
|---|---|---|
| CN | 108791066 A | 11/2018 |
| CN | 211426788 | 9/2020 |

(Continued)

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

(Continued)

*Primary Examiner* — Ephrem Z Mebrahtu
(74) *Attorney, Agent, or Firm* — Fish & Richardson P.C.

(57) ABSTRACT

Provided are interchangeable ring lenses for sensing systems, which can include a LiDAR sensor configured to rotate about a rotation axis within an interchangeable ring lens and receive electromagnetic radiation. Some systems also include a mount portion of the interchangeable ring lens that includes a threaded connection for removably coupling the interchangeable ring lens to a base. Some systems also include the interchangeable ring lens being removable from the base by the threaded connection. Some systems also include an elastomeric seal for at least partially sealing the interchangeable ring lens to the base. Methods and computer program products are also provided.

18 Claims, 11 Drawing Sheets

(56)　　　　References Cited

U.S. PATENT DOCUMENTS

| | | | |
|---|---|---|---|
| 2021/0263153 A1 | 8/2021 | McWhirter | |
| 2021/0325520 A1 * | 10/2021 | Cai | B32B 33/00 |
| 2021/0382147 A1 | 12/2021 | Chen et al. | |
| 2022/0011418 A1 | 1/2022 | Zhou et al. | |
| 2022/0349734 A1 * | 11/2022 | Khajehosseini | G01S 7/4813 |
| 2023/0119371 A1 * | 4/2023 | Zhu | G01S 7/4863 |
| | | | 356/5.01 |
| 2024/0061151 A1 * | 2/2024 | Lu | G01S 7/4816 |

FOREIGN PATENT DOCUMENTS

| | | | |
|---|---|---|---|
| CN | 112698351 A | 4/2021 | |
| GB | 2602154 A * | 6/2022 | B60R 11/00 |
| WO | WO 2016/153687 | 9/2016 | |

OTHER PUBLICATIONS

Notice of Allowance in Korean Appln. No. 10-2023-0019525, mailed on Oct. 30, 2024, 17 pages (with English translation).

\* cited by examiner

300

400

(NOT DRAWN TO SCALE)

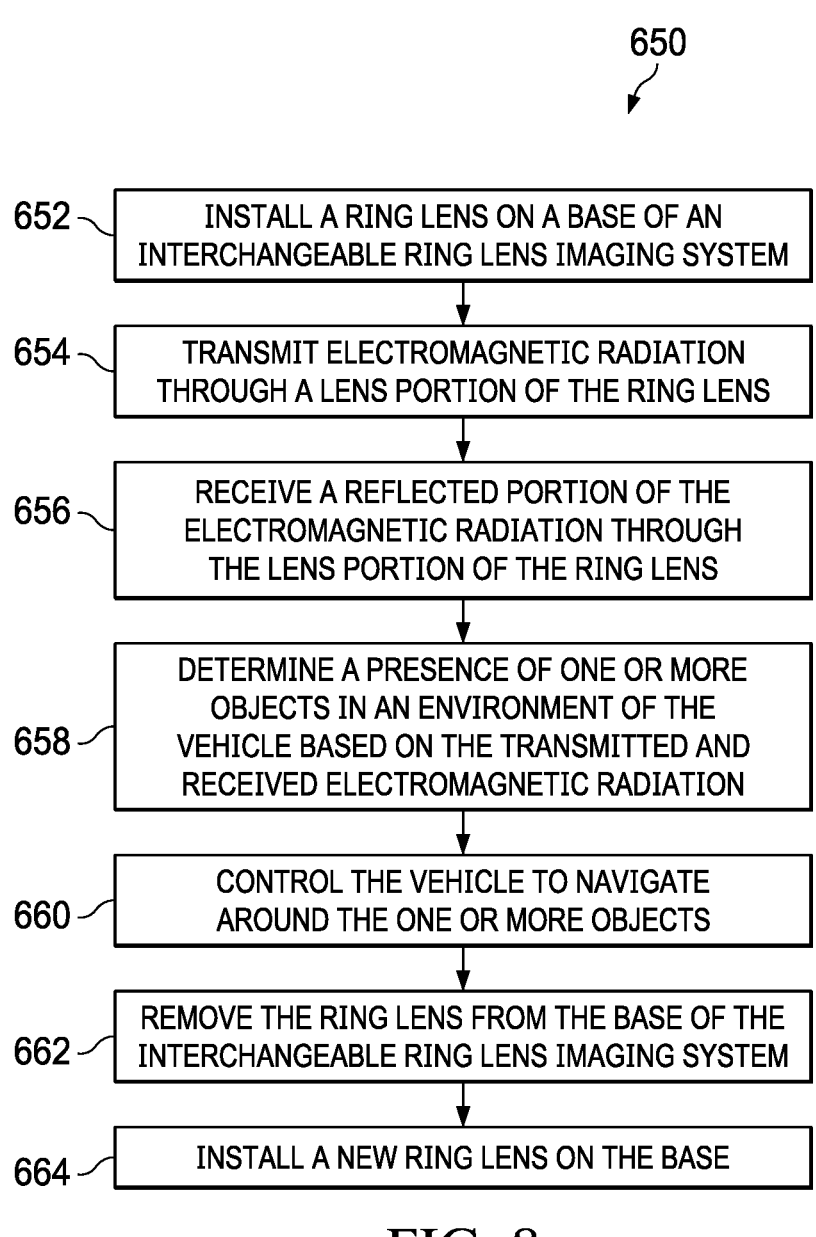

650

652 — INSTALL A RING LENS ON A BASE OF AN INTERCHANGEABLE RING LENS IMAGING SYSTEM

654 — TRANSMIT ELECTROMAGNETIC RADIATION THROUGH A LENS PORTION OF THE RING LENS

656 — RECEIVE A REFLECTED PORTION OF THE ELECTROMAGNETIC RADIATION THROUGH THE LENS PORTION OF THE RING LENS

658 — DETERMINE A PRESENCE OF ONE OR MORE OBJECTS IN AN ENVIRONMENT OF THE VEHICLE BASED ON THE TRANSMITTED AND RECEIVED ELECTROMAGNETIC RADIATION

660 — CONTROL THE VEHICLE TO NAVIGATE AROUND THE ONE OR MORE OBJECTS

662 — REMOVE THE RING LENS FROM THE BASE OF THE INTERCHANGEABLE RING LENS IMAGING SYSTEM

664 — INSTALL A NEW RING LENS ON THE BASE

FIG. 8

INTERCHANGEABLE LENS SYSTEMS

CROSS-REFERENCE TO RELATED APPLICATIONS

This application claims priority to U.S. Provisional Application No. 63/310,426, filed Feb. 15, 2022, the entire contents of which are incorporated herein by reference.

BACKGROUND

Some vehicles include systems configured to capture information in the environment. Components of these systems, such as lenses, are exposed to the elements (e.g., rain, road debris, dust, insects, pollen, UV light, etc.). Over time, this exposure can cause damage to the lenses of the systems (e.g., cracks, blemishes, deformities, discolorations, etc.) and performance can degrade.

BRIEF DESCRIPTION OF THE FIGURES

FIG. 8 is a method of using interchangeable ring lens sensor systems.

DETAILED DESCRIPTION

Figure 1:
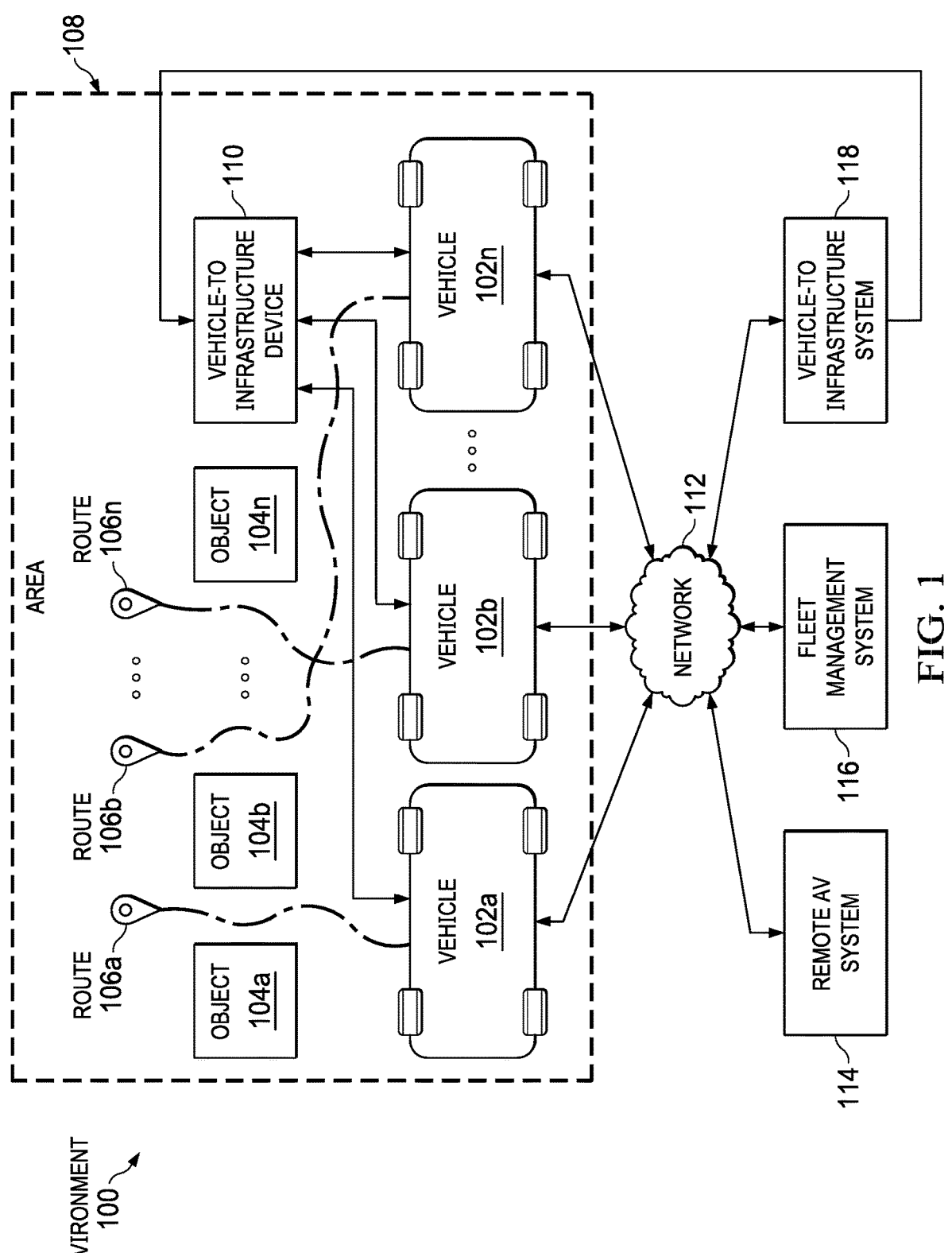
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

The present disclosure relates to interchangeable ring lenses for sensor systems (e.g., imaging systems such as LiDAR systems, camera systems, and/or the like) that are installed on a vehicle. The interchangeable ring lenses described herein can be removed from the sensor system and replaced without removal of the sensor system from the vehicle.

In some aspects and/or embodiments, sensor systems described herein include an interchangeable ring lens, at least one sensor (e.g., an optical sensor such as a LIDAR sensor or camera), and a base. In some systems, the base is attached (e.g., mounted, installed) to a vehicle and the sensors are mounted to the base. In some examples, the base is mounted to the interior or the exterior of a vehicle (e.g., an autonomous vehicle), as described herein. In some examples, the ring lens surrounds the sensors. The ring lens protects the sensors from the ambient environment of the vehicle and can be removed and replaced when needed (e.g., when the ring lens becomes damaged).

In some aspects and/or embodiments, the base also includes a recess for an elastomeric seal (e.g., an o-ring, a gasket, etc.) that engages with a sidewall of the ring lens to at least partially seal the sensor from the ambient environment. The elastomeric seal protects components of the sensor (e.g., electronics such as lasers, optical components, motors, etc.) and the interior of the ring lens (e.g., the inside surface of the side wall) from the elements (e.g., dust, debris, pollen, insects, etc.).

In some aspects and/or embodiments, the ring lens is removably attached to the base such that the ring lens can be removed from the base without removal of the sensors. In some examples, the ring lens is coupled to the base using a threaded connection (e.g., helical thread, National Pipe Thread (NPT)-type thread, American Society of Mechanical Engineers (ASME) thread, etc.) located at a mount portion of the ring lens. The threaded connection allows the ring lens to be screwed onto the base for assembly and unscrewed from the base during removal. After removal of a damaged ring lens, a replacement ring lens can be screwed onto the base enabling continuing operation of the sensor system without requiring a completely new sensor system. And since only the ring lens is replaced and not the sensors or the entire sensor system, installation complexity and costs of the interchangeable ring lens are reduced when compared to non-removable lenses.

In some aspects and/or embodiments, the sensors sense objects around a periphery of a vehicle while the ring lens is installed. For example, the sensors can revolve around a 360° azimuth of the vehicle to detect objects around the vehicle while the ring lens surrounds the sensors. For example, an emitter of the sensor transmits electromagnetic radiation through a sidewall of the ring lens. Reflected electromagnetic radiation then passes through the sidewall of ring lens and is received by a receiver of the sensor. In some examples, the sensors transmit and receive electromagnetic radiation as the sensors rotate inside the ring lens. In this way, the ring lenses described herein circumscribe the sensors of a sensor system enabling the sensors to transmit and receive electromagnetic radiation through the sidewall of the lens at various azimuth orientations.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1.

Additionally, or alternatively, at least one set of elements of environment 100 can perform one or more functions described as being performed by at least one different set of elements of environment 100.

Figure 2:
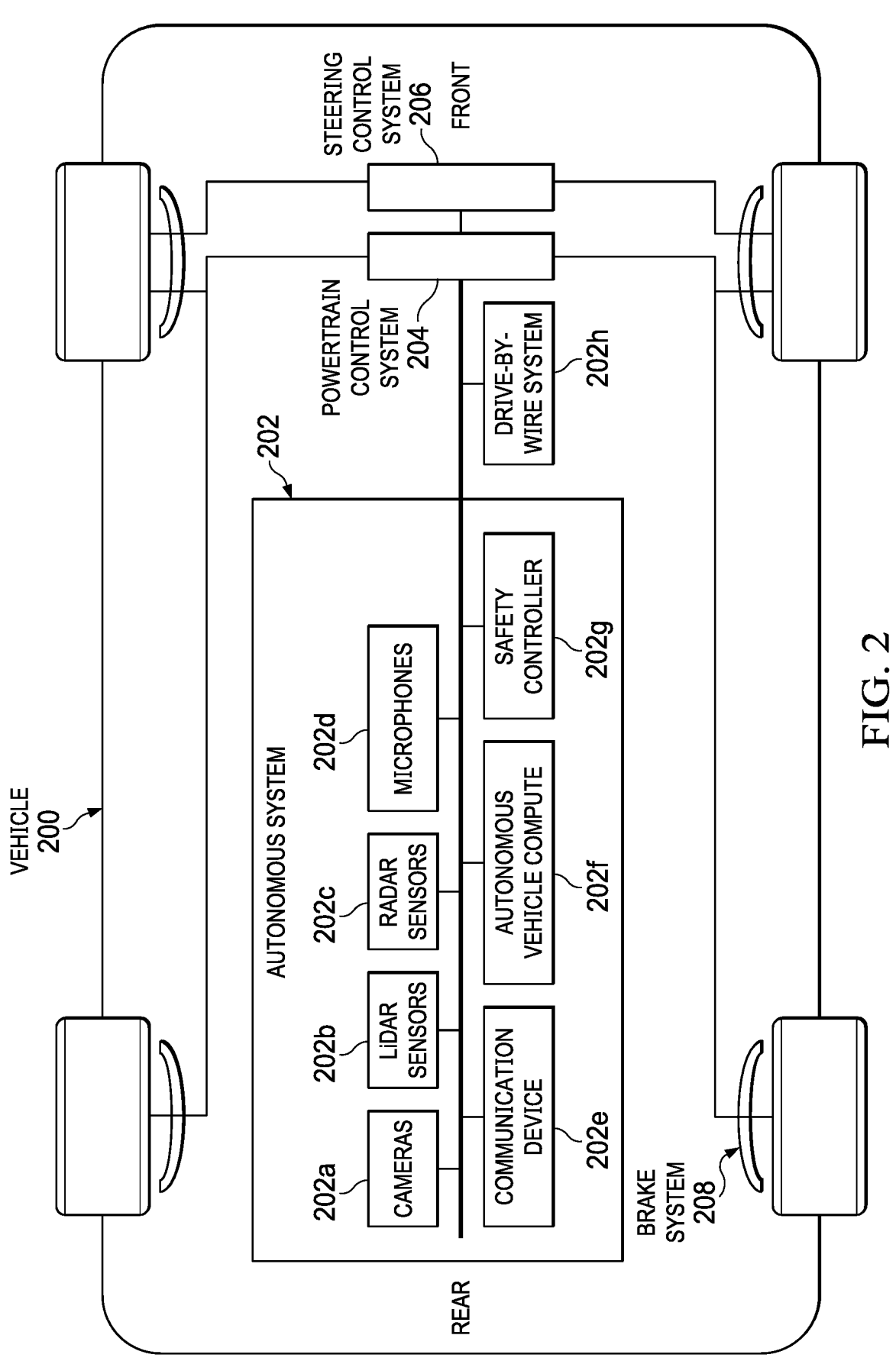
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
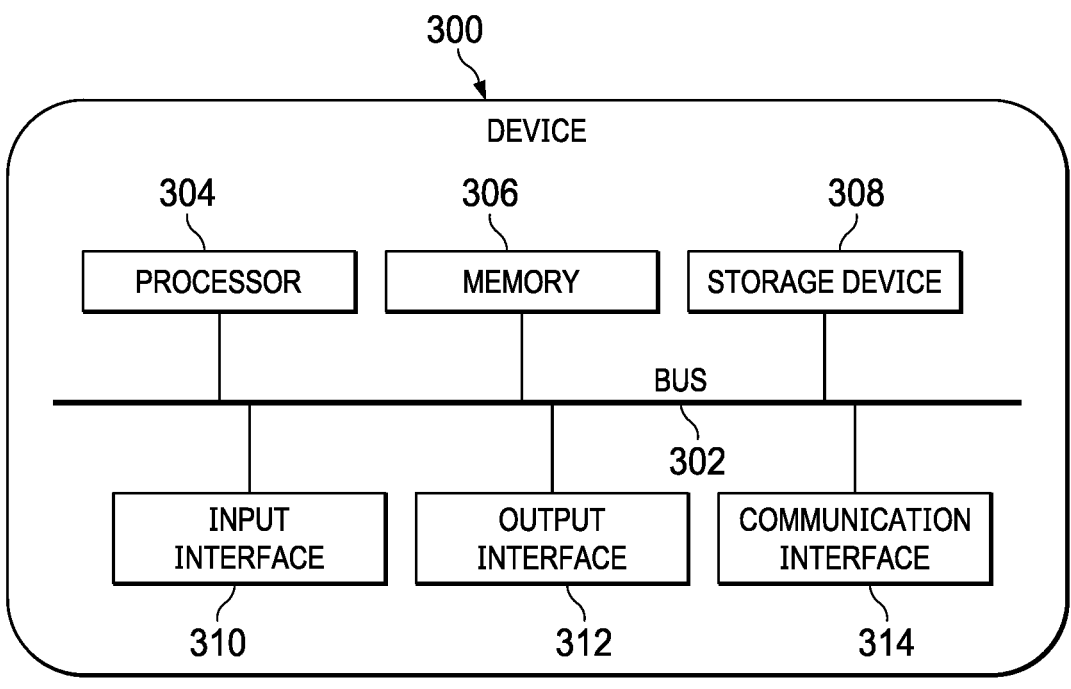
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 and/or one or more devices of network 112 (e.g., one or more devices of a system of network 112). In some embodiments, one or more devices of vehicles 102 and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "system" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a system is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
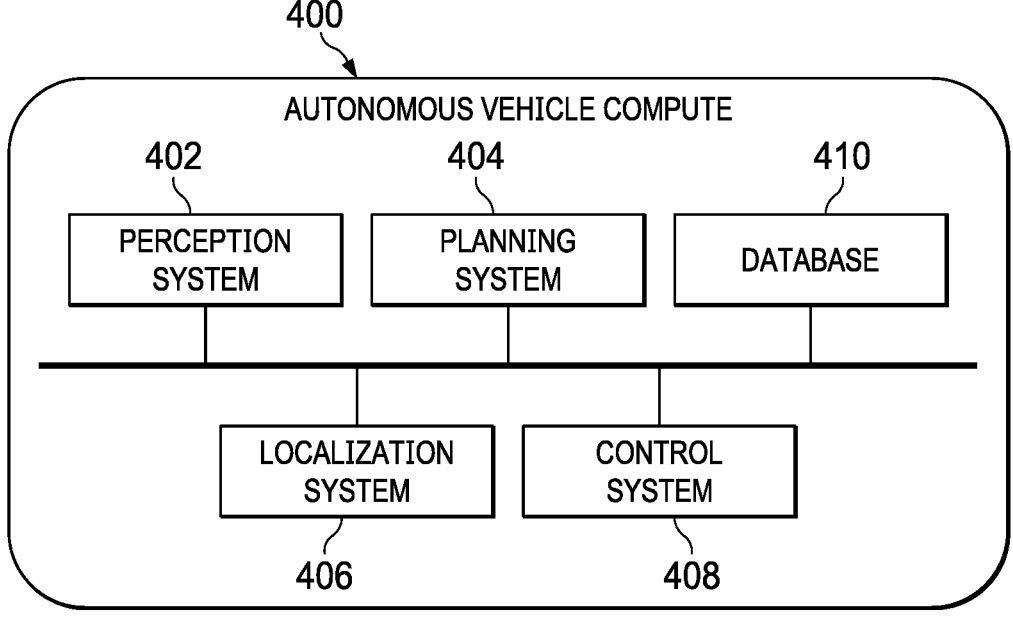
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406, and/or control system

408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LIDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
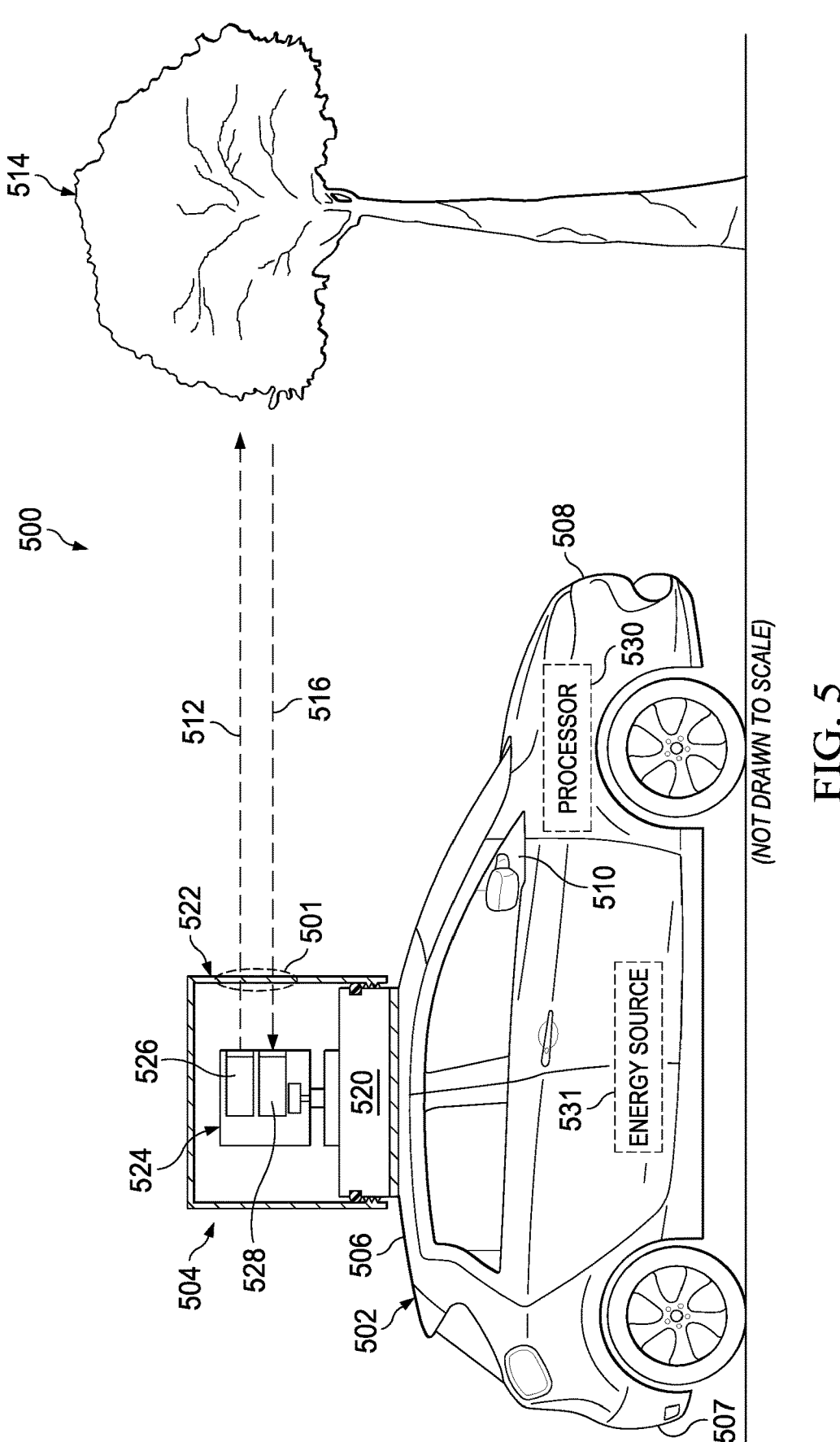
FIG. 5 is an illustration of a vehicle with an interchangeable ring lens sensor system.

FIG. 5 is an illustration of a vehicle 502 including an interchangeable ring lens sensor system 504, the vehicle 502 operating within an environment 500. In some examples, the vehicle 502 is the same as, or similar to, vehicle 102 or vehicle 200 described above with reference to FIGS. 1 and 2, respectively.

In the example shown, the sensor system 504 is mounted to a roof 506 of the vehicle 502. However, in some examples, the sensor system 504 is mounted in other locations of the vehicle including along the front, sides, or rear of the vehicle 502 and/or along the interior of the vehicle 502. As an example, the sensor system 504 can be mounted on the dashboard or the roof inside the vehicle 502 (e.g., using one or more mounts or brackets).

In some examples, the vehicle 502 can include one or more sensors systems 504 mounted in one or more locations of the vehicle 502. For example, in some vehicles, sensor systems 504 are mounted to an interior dashboard, a front bumper 508, the front grille (not shown), a rear bumper 507, and/or adjacent to the side-view mirrors 510. These locations are merely examples and other locations are possible. Some vehicles can include one, two, three, four, five, or more sensor systems 504.

In some examples, the sensor systems 504 are small (e.g., have a mounting surface diameter of less than 10 centimeters (cm), have an overall height of less than 10 cm, etc.) and are light (e.g., have a mass of less than 2 kilograms (kg), etc.) which enable them to be located in various locations of the vehicle 502.

The sensor system 504 includes a base 520, a ring lens 522, and a sensor 524. In some examples, the sensor 524 is an imaging sensor such as a LIDAR sensor configured to transmit and receive electromagnetic radiation having wavelengths between approximately 900-1600 nanometers (nm). In some examples, the sensor 524 is the same as, or similar to, the LiDAR sensors 202B described with reference to FIG. 2.

In operation, an emitter 526 of the sensor 524 emits electromagnetic radiation 512 that passes through a sidewall of the ring lens 522. The sidewall extends through the entire thickness of the ring lens 522 (e.g., from an inner radial surface to an outer radial surface).

In some examples, the ring lens 522 includes a material with at least 75% optical transmissibility at one or more wavelengths of the electromagnetic radiation. For example, the ring lens 522 can include a polycarbonate plastic material that is at least 75% transparent to electromagnetic radiation having wavelengths between 900 nm and 1600 nm. In some examples, the entire ring lens 522 is made of polycarbonate plastic that is at least 75% transparent to electromagnetic radiation having wavelengths between 900 nm and 1600 nm. In some examples, a threaded portion 560 and a top portion 521 is also made of a polycarbonate material and is transparent. In some examples, the top portion 521 is metallic (e.g., includes aluminum) thereby reducing ambient electromagnetic radiation that is received by sensor 524.

In some examples, the ring lens 522 includes an optical coating. For example, the ring lens 522 can include an optical coating on the outer radial surface that filters the electromagnetic radiation. In some examples, the optical coating enables electromagnetic radiation having wavelengths between 900 nm and 1600 nm to pass through the sidewall of the ring lens 522.

A portion of the energy of the electromagnetic radiation 512 is reflected by an object 514 and a portion of the energy is absorbed by the object 514. In this example, the object 514 is represented as a tree but the object 514 could be other objects in the environment 500. For example, the object 514 could be a pedestrian, another vehicle, a building, etc. In some examples, the object 514 is any of the objects 104 described with reference to FIG. 1 (e.g., objects 104A-104n of FIG. 1). The reflected electromagnetic radiation 516 travels back to the sensor 524, passes through the sidewall of the ring lens 522, and is received by a receiver 528 of the sensor 524. In turn, the sensor 524 generates sensor data based on the reflected electromagnetic radiation and based on the transmitted electromagnetic radiation by the emitter 526. For ease of description, the sensor 524 is described as emitting and receiving electromagnetic radiation. In examples, the sensor 524 is a LIDAR. The sensor 524 can include additional or fewer components. In embodiments, the sensor 524 is a camera/imaging sensor, a radar, or any other sensor that receives information and generates sensor data.

In some implementations, the sensor data is sent to a processor 530 of the vehicle 502 using a communication bus (not shown in FIG. 3). In some examples, the processor 304 is the same as, or similar to, the processor 304 described with reference to FIG. 3. In some examples, the communication bus is the bus 302 described with reference to FIG. 3. In some examples, an energy source 531 (e.g., one or more batteries) of the vehicle 502 provides electrical power to the emitter 526 and receiver 528. In some examples, the processor 530 is electrically connected to each of multiple sensors 524 when more than one sensor system is installed on a vehicle. In such examples, the processor 530 is electrically connected to a plurality of sensor systems 504.

Figure 6:
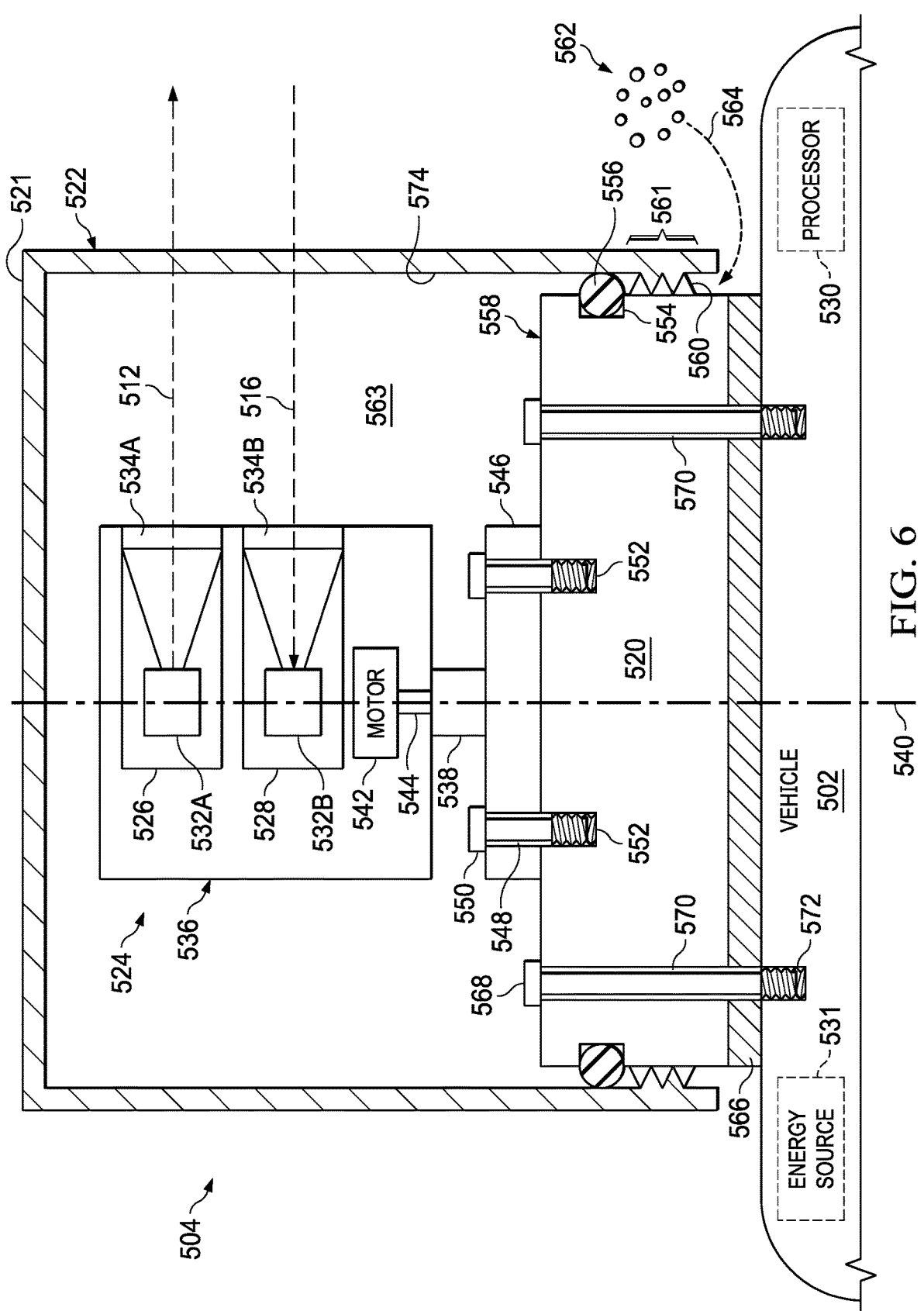
FIG. 6 is an illustration of the interchangeable ring lens sensor system of FIG. 5.

FIG. 6 is an illustration of the interchangeable ring lens sensor system 504. As described with reference to FIG. 5, the sensor system 504 includes a base 520, a ring lens 522, and a sensor 524. The sensor 524 includes a housing 536 that houses the emitter 526 and the receiver 528. Each of the emitter 526 and receiver 528 include electronics 532A, 532B (collectively referred to as electronics 532) for emitting and receiving the electromagnetic radiation. For example, the emitter 526 includes electronics 532A and the receiver 528 includes electronics 532B. In some examples, the electronics 532 include lasers, processors to control the lasers, optical filters, and the like. The electronics 532 are electrically connected to the processor 530. In some examples, the processor 530 is located within the vehicle 502 (as shown in FIG. 6). In other examples, the processor 530 is located within the sensor 524. In some examples, the electrical connection to the processor 530 is a wireless connection using a wireless protocol (e.g., Wi-Fi, Bluetooth, etc.). In some examples, this electrical connection to the processor 530 is a wired connection using one or more electrical wires.

In some examples, the sensor system 504 includes one or more lenses within the ring lens 522. For example, one or more optical lenses. In some examples, the sensor system 504 includes internal lenses 534A, 534B (collectively referred to as lenses 534) located within the ring lens 522. In some examples, the emitter 526 includes the lens 534A and the receiver 528 includes the lens 534B. In some examples, the lenses 534 protect the electronics 532 from the elements. In some examples, the lenses 534 prevent users from inserting their fingers or other objects into the emitter 526 and receiver 528, thereby preventing touching of the electronics 532 by blocking an access path to the electronics 532.

In some examples, the lenses 534 are optically transparent and/or translucent. For example, the lenses 534 include a polycarbonate material that is at least 80% transparent to electromagnetic radiation having wavelengths between 900 nm and 1600 nm.

In some examples, the electromagnetic radiation passes through both of the lenses 534 and the sidewall of the ring lens 522. For example, the emitter 526 transmits electromagnetic radiation 512 through the lens 534 and the sidewall while the receiver 528 receives electromagnetic radiation 516 that has passed through the sidewall and the lens 534.

While lenses 534 are illustrated in the sensor system 504, in some examples the lenses 534 are excluded. For example, lenses 534 can be excluded because the ring lens 522 seals the electronics 532 from the environment (e.g., by the seal 556). In such examples, the emitter 526 transmits electromagnetic radiation 512 through the sidewall of the ring lens 522 while the receiver 528 receives electromagnetic radiation 516 that has passed through the sidewall of the ring lens 522.

In some examples, the housing 536 is pivotably mounted. For example, the housing 536 is pivotably mounted on an end of a pedestal 538. This allows the housing 536 to rotate with respect to a longitudinal axis 540 of the pedestal 538.

In some examples, the sensor system 504 includes one or more motors. For example, the sensor system 504 includes a motor 542 that is rotationally affixed to the housing 536. In some examples, the motor 542 controls the rotation of the housing 536 about the longitudinal axis 540 by rotating a shaft 544 that is affixed to the pedestal 538. Thus, as the motor 542 spins, the shaft 544 remains fixed to the pedestal 538 which causes the housing 536 to rotate relative to the pedestal 538. In some examples, one or more gears, linkages, cams, and/or belts are used to transfer rotation between the motor 542 and the pedestal 538.

This rotational capability enables the sensor 524 to scan objects around a complete 360° azimuth of the sensor 524. The sensor 524 is configured to receive electromagnetic radiation at a plurality of azimuth angles through the sidewall of the ring lens 522 as the housing 536 rotates.

In some examples, the motor 542 communicates with the processor 530. For example, the motor 542 communicates with the processor 530 using either a wireless or wired connection. In some examples, the processor 530 determines control signals for the motor 542 and transmits these signals to the motor 542 to cause the emitter 526 and receiver 528 to rotate around the longitudinal axis 540. In some examples, the motor 542 rotates the housing 536 to a particular position (e.g., 20° from a forward heading, 30°, etc.).

In some examples, the sensor system 504 includes an energy source. For example, the sensor system 504 includes an energy source 531 located within the vehicle 502. In some examples, the sensor system 504 includes an energy source directed inside the interior space 563 of the sensor system 504. In some examples, the energy source 531 provides electrical power to the motor 542, the processor 530, and the electronics 532.

In some examples, the sensor 524 includes a mount. For example, the sensor 524 includes a mount 546 that is mechanically attached to the pedestal 538 and affixes the sensor 524 to the base 520. In some examples, the mount 546 includes one or more through-holes 548 for fastening hardware 550. In the example shown, the fastening hardware 550 includes bolts but other fasteners can be used. For example, screws and rivets can also be used to affix the sensor 524 to the base 520 in addition to, or instead of, the bolts shown in this example.

In some examples, the base 520 includes a first set of one or more holes for mounting the sensor 524 to the base 520. For example, the base 520 includes one or more blind holes 552 with internal threads for threadably receiving the fastening hardware 550. This threaded engagement affixes the sensor 524 to the base 520 so that the sensor 524 can rotate along the longitudinal axis 540 with respect to the base 520.

In some examples, the base 520 includes one or more recesses. For example, the base 520 is cylindrical and includes a circumferential recess 554 located on an outer radial surface 558 of the base 520. The recess 554 spans the entire circumference of the base 520. The recess 554 is configured to receive (e.g., house) an elastomeric seal 556. In some examples, the recess 554 is a channel circumscribing the base 520.

In some examples, the elastomeric seal 556 at least partially seals the ring lens 522 to the base 520. For example, the seal 556 substantially prevents airborne particulates 562 (e.g., debris, dust, pollen, etc.) from entering from the ambient environment into the internal space 563 of the sensor system 504. As the airborne particulates 562 travel towards the internal space 563 (e.g., by moving along the path 564), the airborne particulates are stopped by the presence of the seal 556.

In some examples, the recess 554 is square-shaped. For example, the recess 554 is a square-shaped o-ring groove and the seal 556 is an o-ring seal. In some examples, the recess is a gasket surface and the seal is a gasket. In some examples, other recesses and seals can be used with the sensor system 504.

In some embodiments, the ring lens 522 includes a recess for housing an elastomeric seal. For example, the ring lens 522 can include a recess located on an interior radial surface. In some examples, this recess is a channel circumscribing the ring lens 522. In some embodiments, both the ring lens 522 and the base 520 include recesses to house respective elastomeric seals. That is, more than one elastomeric seal can be used to prevent airborne particulates 562 from entering from the ambient environment into the internal space 563 of the sensor system 504.

In some examples, the base 520 includes one or more threaded portions. For example, the base 520 includes a threaded portion 560 with one or more threads located on an outer radial surface 558 of the base 520. In some examples, the threaded portion 560 includes a helical thread, an NPT thread, an ASME thread, and/or the like.

In some examples, the threaded portion 560 engages a counterpart threaded portion of the ring lens. For example, the ring lens 522 includes a counterpart threaded portion 560 located on a mount portion 561 of the ring lens 522. The mount portion 561 includes an inner radial surface 574 of the ring lens 522. This threaded engagement allows the ring lens 522 to be attached and removed from the sensor system 504 by rotating the ring lens 522 with respect to the base 520. For example, a clock-wise rotation of the ring lens 522 with respect to the base 520 screws the ring lens 522 onto the base 520 and a counter-clock-wise rotation of the ring lens 522 with respect to the base 520 unscrews the ring lens 522 from the base 520.

In some examples, the base 520 is mechanically mounted to the vehicle 502. For example, the base 520 is mechanically mounted to the vehicle 502 using one or more mechanical fasteners. For example, the base 520 includes one or more through-holes 570 to accommodate mechanical fasteners 568. In some examples, the mechanical fasteners 568 mechanically fix the base 520 to the vehicle 502 so that the sensor system 504 does not fall off of the vehicle 502 while the vehicle 502 is in motion. In the example shown, the mechanical fasteners 568 include bolts but other fasteners can also be used. For example, screws and rivets can also be used to affix the base 520 to the vehicle 502 in addition to, or instead of, the bolts shown in this example.

In some examples, the vehicle 502 includes one or more mounting holes for mounting the sensor system 504 to the vehicle 502. For example, the vehicle 502 includes one or more blind holes 572 with internal threads for threadably receiving mechanical fasteners 568 to mount the base 520 to the vehicle 502. This threaded engagement affixes the base 520 to the vehicle 502 so that the sensor 524 can rotate around the longitudinal axis 540 with respect to the vehicle 502 and remain secured to the vehicle 502 while the vehicle is in motion.

In some examples, the ring lens 522 is removable from the sensor system 504. For example, the ring lens 522 is removable and replaceable while the base 520 is attached to the vehicle 502. For example, a user can unscrew the ring lens 522 to remove the ring lens 522 while the sensor system 504 is mounted to the vehicle 502. In some examples, the sensor system 504 is installed inside the vehicle 502 and the user unscrews the ring lens 522 from the inside of the vehicle 502 to remove and replace the ring lens 522.

In some examples, the sensor system 504 includes a mount 566 for mounting the base 520 to the vehicle 502. For example, the mount 566 can include a bracket. In some examples, the sensor system 504 includes a mount 566 that is located directly between the base 520 and the vehicle 502. In this example, the mount 566 provides a rigid structural connection between a structural frame of the vehicle 502 and the base 520.

In some examples, the mount 566 includes an elastomeric pad that vibrationally isolates the sensor 524 from vibrations of the vehicle 502. In some examples, the elastomeric pad is a sheet of neoprene rubber located between the mount 566 and the base 520.

In some examples, the sensor system 504 can be attached to the vehicle 502 irrespective of whether the ring lens 522 is attached to the sensor system 504. For example, since the base 520 can mount directly to the vehicle 502 (e.g., via the mount 566), the sensor 524 can be mounted to the vehicle 502 even if the ring lens 522 is detached from the base 520. In this way, a user can remove and replace the ring lens 522 without needing to remove the sensor 524 from the vehicle 502, thereby making removal and replacement easier than in scenarios where the sensor would need to be removed in order to replace the ring lens.

Figure 7:
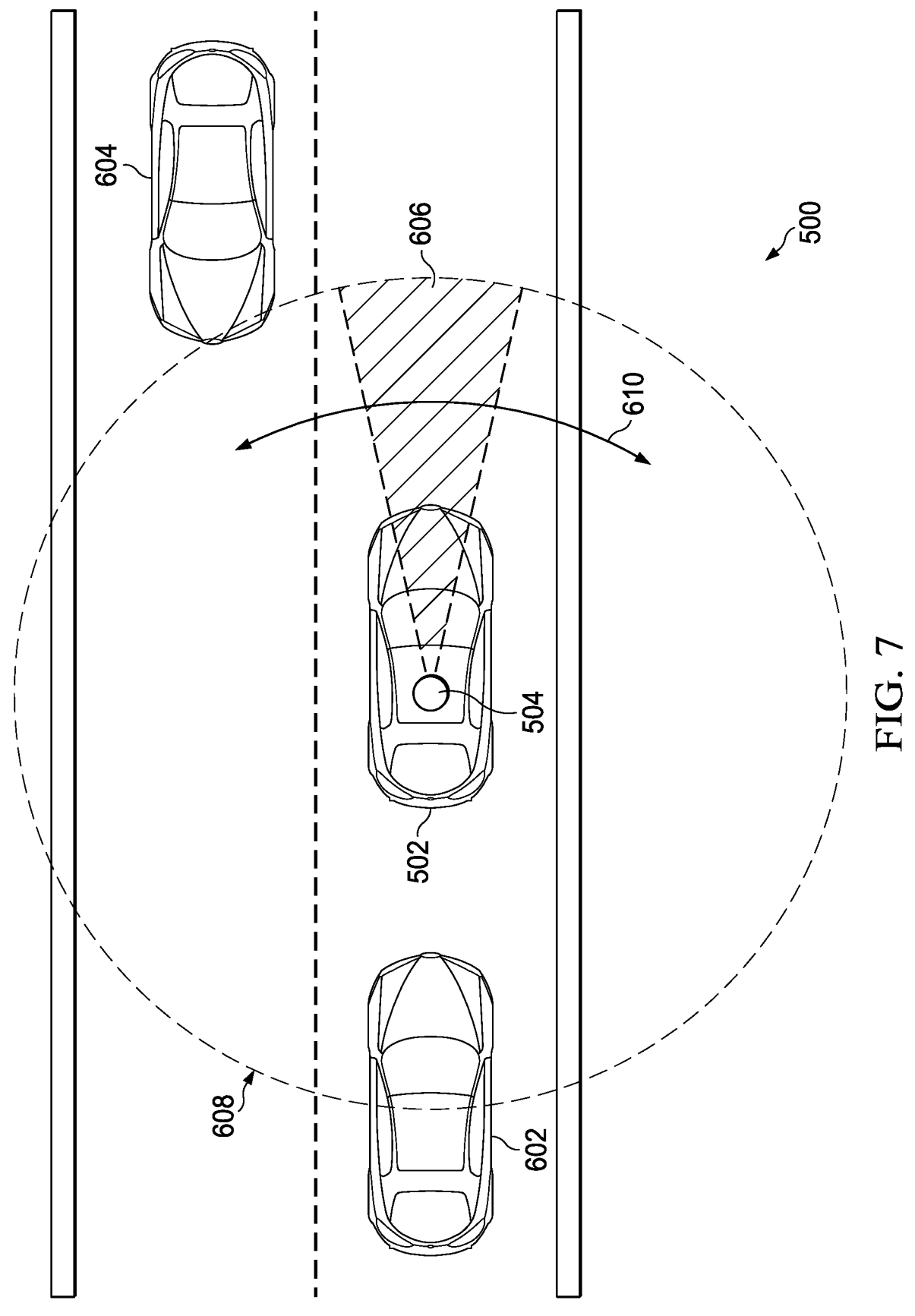
FIG. 7 is an illustration of an azimuth scanning capability of the interchangeable ring lens sensor system of FIG. 5.

FIG. 7 is an illustration of an azimuth scanning capability of the sensor system 504. The interchangeable ring lens sensor system 504 is mounted to the roof of the vehicle 502 as described above with reference to FIG. 6. The environment 500 includes other objects (e.g., vehicles 602 and 604) that are detected by the interchangeable ring lens sensor system 504.

In some examples, the emitter 526 transmits electromagnetic radiation and the receiver 528 receives reflected electromagnetic radiation. For example, the emitter 526 continuously transmits electromagnetic radiation through the sidewall of the ring lens 522. The electromagnetic radiation then reflects off of the objects of the environment, and the reflected electromagnetic radiation is received through the sidewall of the ring lens 522 by the receiver 528.

In some examples, the electromagnetic radiation propagates within a sensing zone. For example, the electromagnetic radiation propagates within a sensing zone 606 in the environment surrounding the vehicle 502. Generally, the "sensing zone" refers to a bounded 3D volumetric space where objects can be detected by sensor system 504. The volumetric dimensions of the sensing zone 606 are a function of the optical configuration of the emitter 526 and receiver 528 (e.g., the particular lenses 534 used). Additionally, the boundary 608 of the sensing zone 606 generally corresponds to a maximum radial distance away from the sensor system 504 where objects can be detected by the receiver 528. The radial distance of the boundary 608 is a function of the transmitted power of the emitter 526 and the sensitivity of the receiver 528.

In operation, and as described above with reference to FIG. 6, the processor 530 transmits control signals to the motor 542 which causes the motor 542 to rotate the emitter 526 and receiver 528 around the longitudinal axis 540. In some examples, as the emitter 526 and receiver 528 rotate, they continuously transmit and receive electromagnetic radiation through the sidewall of the ring lens 522. This rotation causes the sensing zone 606 to revolve around the longitudinal axis 540 in the direction represented by arrow 610. By rotating the sensing zone 606 around the longitudinal axis 540, objects are detected around the entire vehicle 502. For example, objects to the left, right, and rear of the vehicle 502 can be detected as the sensing zone 606 revolves around the longitudinal axis 540 to the left, right, and rear of the vehicle 502, respectively.

FIG. 8 is a method 650 of using interchangeable ring lens sensor systems. In some examples, one or more steps of method 650 is performed by a user and one or more steps is performed by one or more components of a sensor system (e.g., the electronics 532 of the emitter 526, the electronics 523 of the receiver 528, the processor 530, etc.).

At step 652, a user installs a ring lens on a base of an interchangeable ring lens sensor system. For example, the ring lens 522 is threadably installed on the base 520 of the sensor system 504 by screwing the ring lens 522 onto base

520 to engage the threaded portion 560 of the ring lens 522 with the threaded portion 560 of the base 520.

At step 654, an emitter emits electromagnetic radiation through a sidewall of the ring lens. For example, the processor 530 controls the emitter 526 to emit electromagnetic radiation 512 through the sidewall of the ring lens 522. In some examples, the processor 530 controls an azimuth of the sensor 524 while transmitting the electromagnetic data. In scenarios with multiple sensor systems, the processor 530 transmits one or more control signals to each sensor for controlling an azimuth angle of each sensor system. In examples, an azimuth angle is an angular measurement in a spherical coordinate system.

At step 656, a receiver receives a reflected portion of the electromagnetic radiation through the sidewall of the ring lens. For example, the electromagnetic radiation 512 contacts one or more objects (for example, objects 104a-104n of FIG. 1, object 514 of FIG. 5, vehicle 602, and/or vehicle 604 of FIG. 6) and a portion of the electromagnetic radiation 516 is reflected off of the one or more objects. The reflected portion of the electromagnetic radiation 516 propagates toward the receiver 528, through the sidewall of the ring lens 522, and is received by the receiver 528. In some examples, the processor 530 controls the azimuth of the sensor 524 while receiving the electromagnetic data. In some examples, the emitting and the receiving steps are performed simultaneously.

At step 658, the processor determines a presence of one or more objects in an environment of the vehicle based on the transmitted and received electromagnetic radiation. For example, the processor 530 receives sensor data about the emitted and received electromagnetic radiation. Upon processing the sensor data, the processor 530 determines a location of one or more objects in the environment 500 of the vehicle 502. In some examples, the autonomous vehicle compute 400 of the vehicle 502 determines the presence of the one or more objects. In some examples, the perception system 402 determines the presence of the one or more objects. In turn, the perception system 402 determines data about each of the one or more objects (e.g., position data, velocity data, acceleration data, volumetric boundary data, etc.) The perception system can also classify the one or more objects detected in the environment using the sensor data.

At step 660, a control system controls the vehicle to navigate around the one or more objects. For example, the perception system 402 transmits the data associated with the classification of the physical objects in the environment to a planning system 404. The planning system 404 determines one or more control signals for controlling a powertrain control system 204 and/or the steering control system 206 based on the data associated with the classification of the physical objects. In turn, the powertrain control system 204 and/or the steering control system 206 navigates the vehicle by controlling a 2D positon, 2D velocity, and/or 2D acceleration of the vehicle to navigate around the one or more objects.

At step 662, a user (either the same user from step 652 or a different user) removes the ring lens from the base of the interchangeable ring lens sensor system. For example, in scenarios where the ring lens 522 becomes damaged or otherwise needs to be replaced, the user can remove the damaged ring lens 522 from the base 520 by unscrewing the ring lens 522 from the base 520.

At step 664, a user (either the same users from steps 652, 662, or a different user) installs a new ring lens on the base. For example, once the ring lens 522 has been removed, the user can install an identical new ring lens 522 on the base

520. All of the steps of method 650 can then be repeated to extend the operational life of the sensor system 504.

Figure 9:
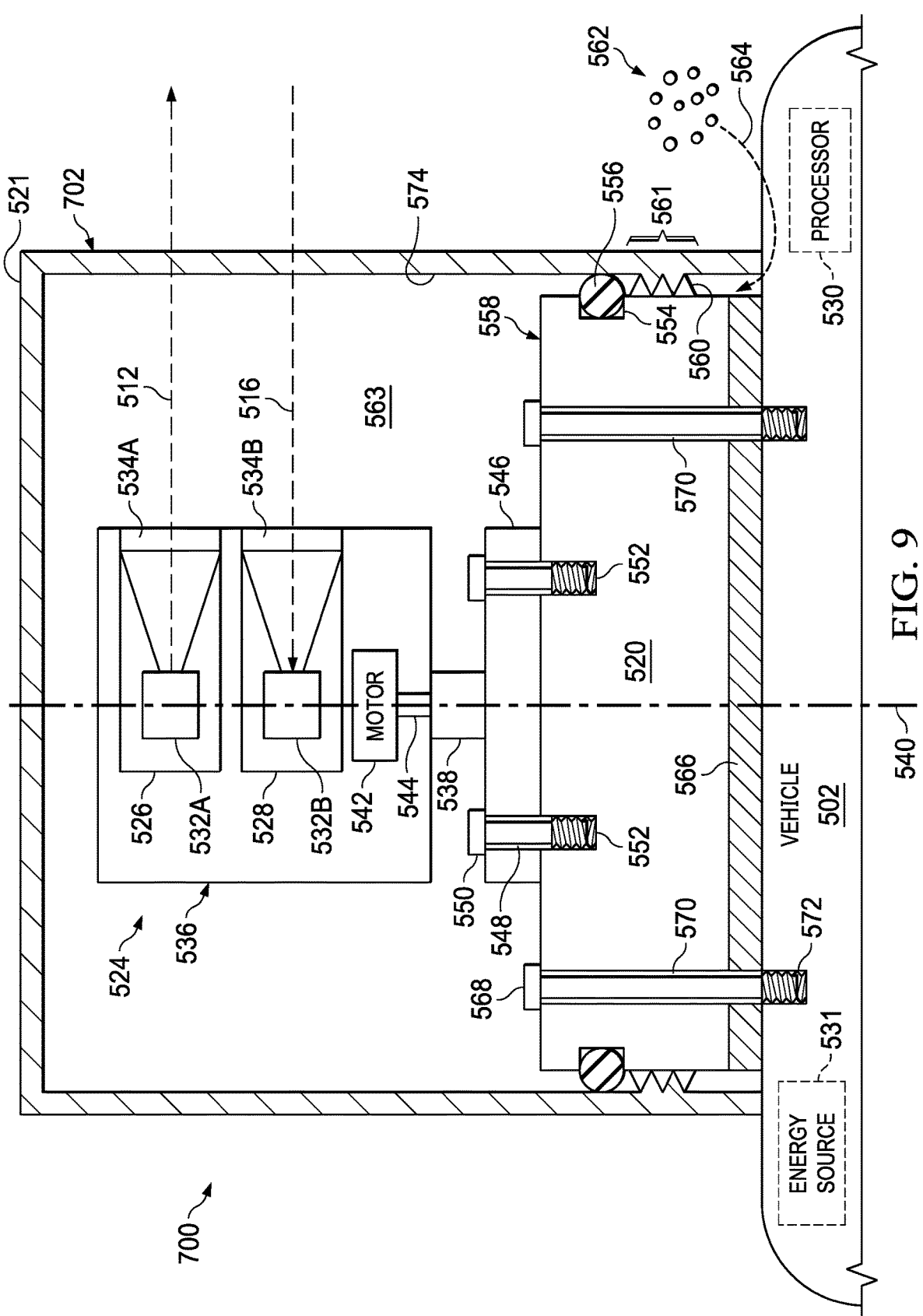
FIG. 9 is an illustration of an interchangeable ring lens sensor system with a ring lens that fully covers a base of the system.

FIG. 9 is an illustration of an interchangeable ring lens sensor system 700 with a ring lens 702 that fully covers a base of the sensor system 700. Components and features that are the same, or substantially similar to, the components and features of the sensor system 504 are shown using the same reference numerals.

A difference of sensor system 700 compared to sensor system 504 is that sensor system 700 includes a ring lens 702 that fully extends to the vehicle 502. In some examples, the ring lens 702 physically contacts the vehicle 502. In such an example, the contact changes the airflow path 564 such that the particulates 562 are impeded by the contact between the ring lens 702 and the vehicle 502. In some examples, the ring lens 702 includes the same material and transparency of the ring lens 522.

While a direct contact between the ring lens 702 and the vehicle 502 is described and illustrated, in some examples, the ring lens 702 is offset from the vehicle by a small distance (e.g., 1 cm, etc.). In some examples, instead of direct contact between the ring lens 702 and the vehicle 502, the ring lens 702 contacts a protrusion of the base 520 (this contact is not explicitly shown).

Figure 10:
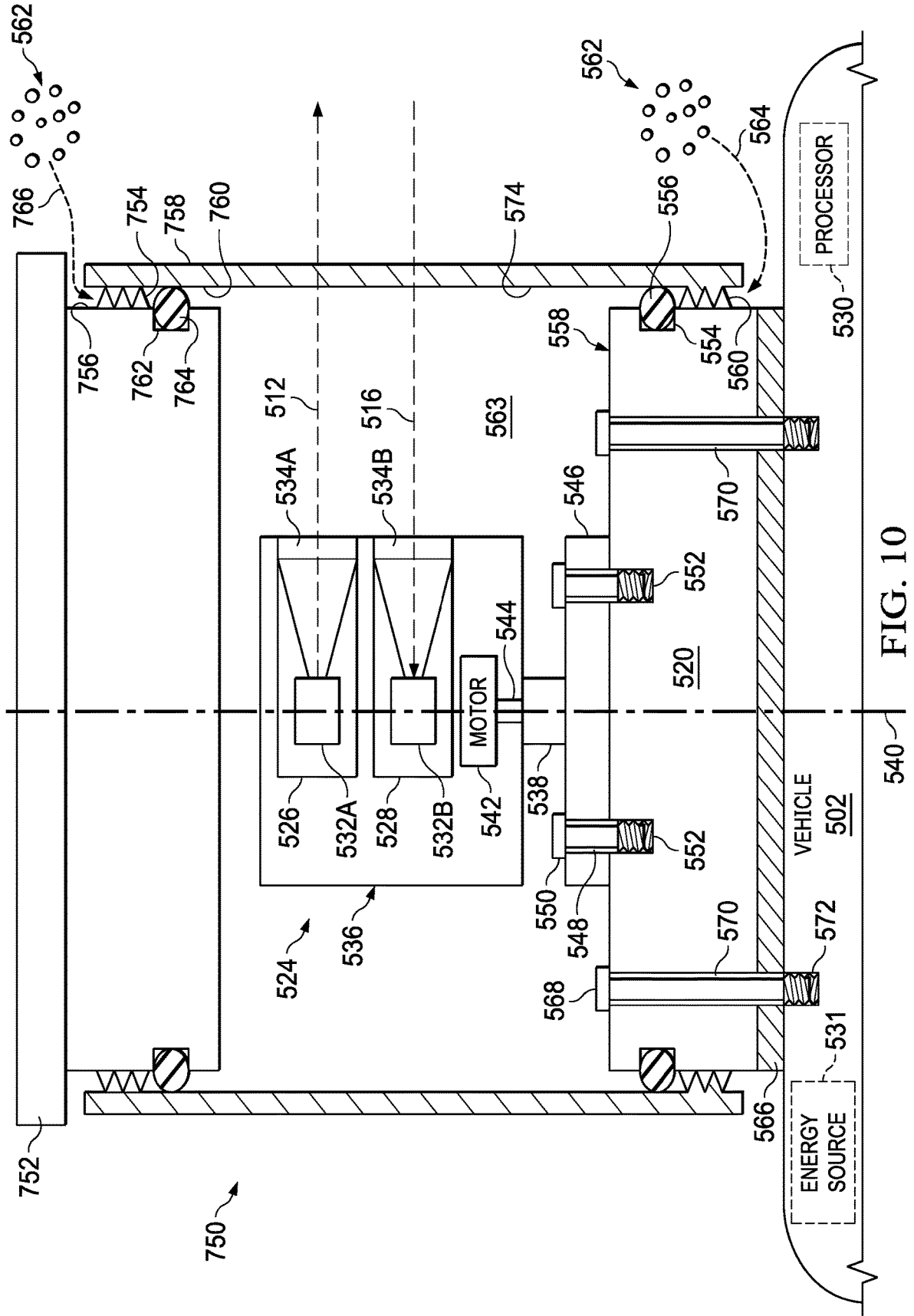
FIG. 10 is an illustration of an interchangeable ring lens sensor system with a removable cover.

FIG. 10 is an illustration of an interchangeable ring lens sensor system 750 with a removable cover 752. Components and features that are the same, or substantially similar to, the components and features of the sensor system 504 are shown using the same reference numerals.

A difference of sensor system 750 compared to sensor system 504 is that sensor system 700 includes a removable cover 752. A removable cover 752 allows a user to access the components inside the sensor system 750. For example, with the removable cover 752 removed, the user can remove and replace the sensor 524 (e.g., by removing the fastening hardware 550 (in this example, bolts)) and lifting the sensor 524 away from the base 520. Then the user can reinstall the cover 752.

In some examples, the removable cover 752 includes one or more threaded portions. For example, the removable cover 752 includes a threaded portion 754 located on an outer radial surface 756 of the cover 752. In some examples, the threaded portion 754 includes a helical thread, an NPT thread, an ASME thread, and/or the like.

In some examples, the threaded portion 754 is configured to engage the ring lens 758. For example, the threaded portion 754 is configured to threadably engage with the ring lens 758. In some examples, the ring lens 758 includes a counterpart threaded portion 754 located on an inner radial surface 760 of the ring lens 758. The threaded engagement between the cover 752 and the ring lens 758 allows the cover 752 to be attached and removed from the ring lens 758 (and more generally, the sensor system 750) by rotating the cover 752 with respect to the ring lens 758. For example, a clock-wise rotation of the cover 752 with respect to the ring lens 758 screws the cover 752 onto the ring lens 758 and a counter-clock-wise rotation of the cover 752 with respect to the ring lens 758 unscrews the cover 752 from the ring lens 758.

In some examples, the cover 752 includes one or more recesses. For example, the cover 752 is cylindrical and includes a circumferential recess 762 located on the outer radial surface 756. The recess 762 spans the entire circumference of the cover 752. The recess 762 is configured to receive an elastomeric seal 764 for at least partially sealing the sensor 524 from the ambient environment. For example, the seal 764 substantially prevents the particulates 562 from entering from the environment into the internal space 563 of the sensor system 750. For example, as the particulates 562 move in towards the internal space 563 (e.g., by moving along the path 766), the particulates are stopped by the presence of the seal 764.

In some examples, the recess 762 is square shaped. For example, the recess 762 is a square-shaped o-ring groove and the seal 764 is an o-ring seal. In some examples, the recess is a gasket surface and the seal is a gasket. In some examples, other recesses and seals can be used with the sensor system 750.

Figure 11:
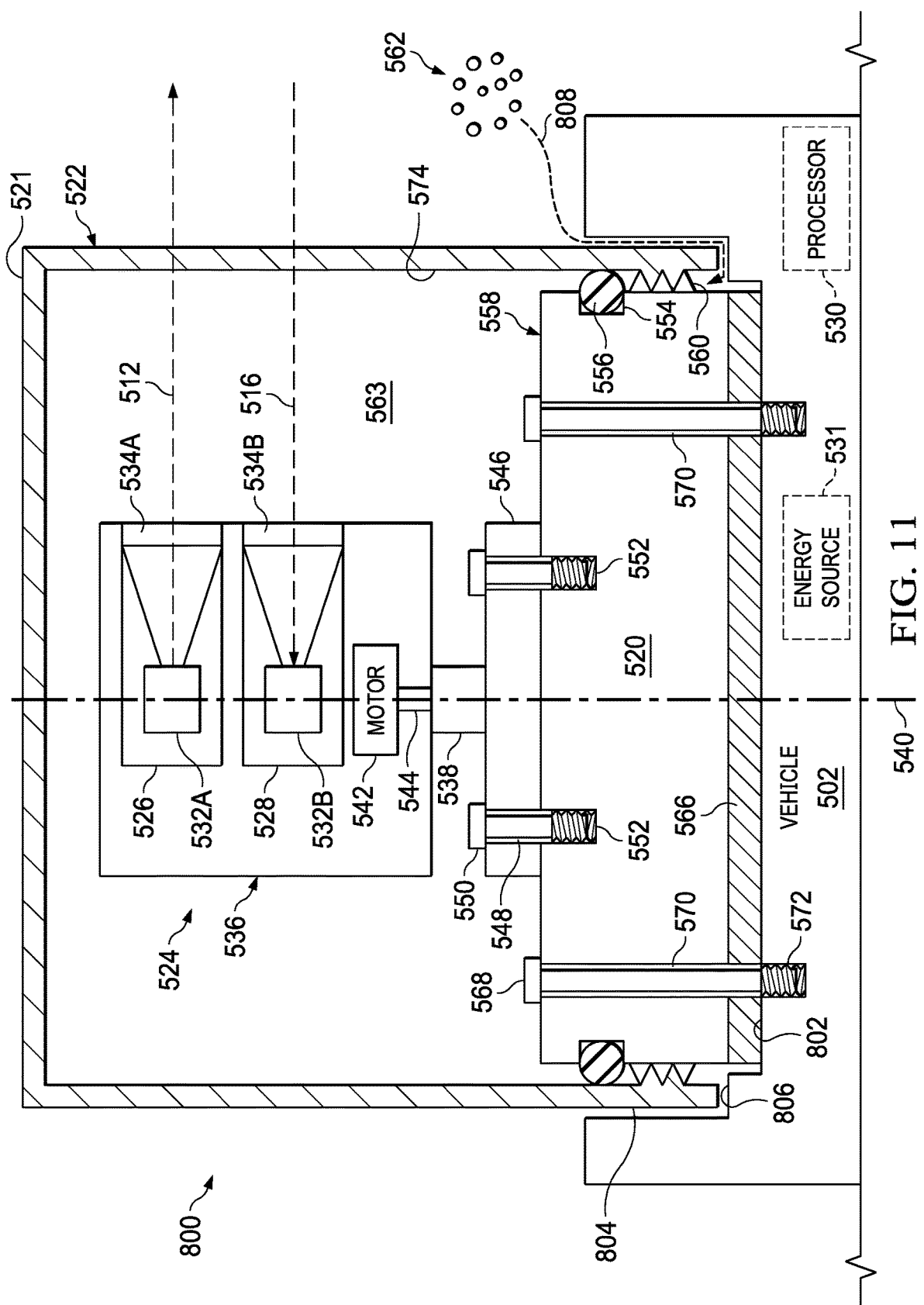
FIG. 11 is an illustration of an interchangeable ring lens sensor system mounted within a recess of a vehicle.

FIG. 11 is an illustration of an interchangeable ring lens sensor system 800 mounted within a recess 802 of a vehicle (for example, vehicle 502). Components and features that are the same, or substantially similar to, the components and features of the sensor system 504 are shown using the same reference numerals.

A difference of sensor system 800 compared to sensor system 504 is that sensor system 800 is mounted within a recess 802 of the vehicle 502. For example, mounting the sensor system 800 within a recess 802 allows the ring lens 522 of the sensor system 800 to mount the vehicle 502 with a lower profile than the sensor system 504 shown in FIG. 6. This lower profile protects a lower portion 804 of the ring lens 522 from the elements.

Additionally, because the sensor system 800 is mounted at a lower profile, the airflow path from the environment into the internal space 563 is different from the path shown in FIGS. 6, 9, and 10. For example, as the particulates 562 move along path 808, the particulates 562 travel into the recess 802. This movement into the recess 802 results in a longer travel path for the particulates 562 and improves the sealing ability of the sensor system 800.

In some examples, the recess 802 includes one or more step features. For example, the recess 802 includes a step feature 806 configured to engage the ring lens 522 when the ring lens 522 is fully installed onto the base 520.

Figure 12:
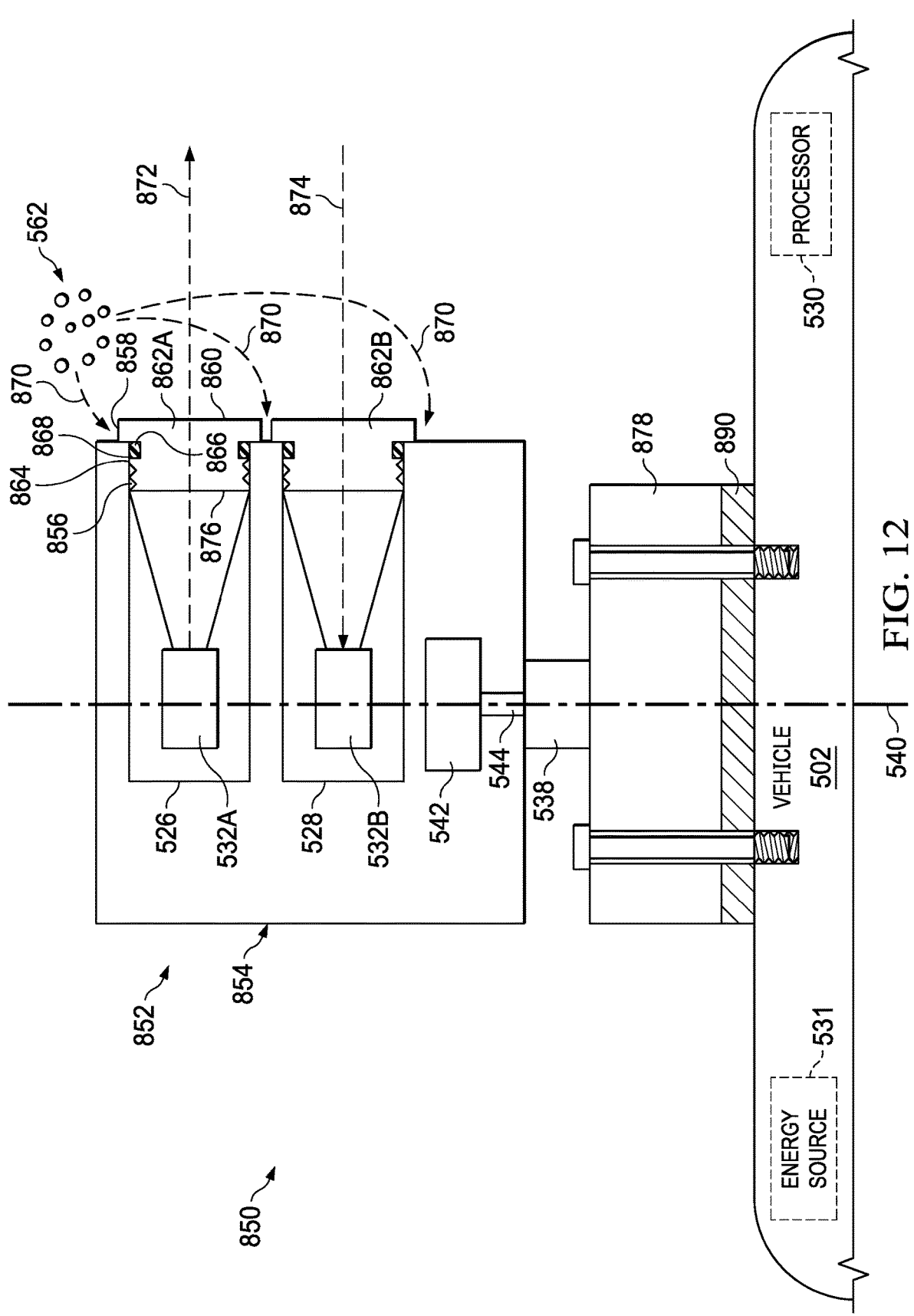
FIG. 12 is an illustration of an interchangeable ring lens sensor system.

FIG. 12 is an illustration of an interchangeable lens sensor system 850 with one or more interchangeable lenses. Components and features that are the same, or substantially similar to, the components and features of the sensor system 504 are shown using the same reference numerals. The sensor system 850 includes a sensor 852 with an emitter 526 and a receiver 528. In some examples, the sensor 852 is the same as the sensor 524 described with reference to FIG. 6 except for the following differences.

In some examples, the sensor 852 includes a housing 854 that includes one or more interchangeable lenses. For example, the sensor 852 includes lenses 862A, 862B (collectively referred to as lenses 862). In the example shown, the emitter 526 includes interchangeable lens 862A and receiver 528 includes interchangeable lens 862B. Generally, the sensor system 850 does not include a ring lens surrounding the sensor 852. This means that the lenses 862 are exposed to the elements and can be damaged during use when mounted to the vehicle 502.

The lenses 862 are configured to be removed from the sensor 852 so that they can be replaced. In this way, the lenses 862 enable similar functionality as the interchangeable ring lenses 522, 702, and 758.

In some examples, the lenses 862 include one or more threads 856. For example, the lens 862A includes one or more threads 856 located on an outer radial surface of the lens 862A. The threads 856 are configured to engage counterpart threads 856 located on an inner radial surface of a housing of the emitter 526. The threads enable a user to unscrew a damaged lens 862A from the emitter 526 and replace the lens with an identical new lens 862A by screwing on the new lens 862A using the threads 856. In some examples, the threads 856 include a helical thread, an NPT thread, an ASME thread, and/or the like.

In some examples, the lenses include 862 an outer radial gripping surface 858. For example, the lens 862A includes an outer radial surface 858 for gripping the lens 862A to remove/replace the lens 862A from the emitter 526. In some examples, the gripping surface 858 includes a knurled gripping pattern to increase the friction between the fingers of a user and the lens 862A.

In some examples, the lenses 862 include a material with at least 75% optical transmissibility at one or more wavelengths of the electromagnetic radiation. For example, the lens 862A can include a polycarbonate plastic material that is at least 75% transparent to electromagnetic radiation having wavelengths between 900 nm and 1600 nm. In some examples, the entire lens 862A is made of polycarbonate plastic that is at least 75% transparent to electromagnetic radiation having wavelengths between 900 nm and 1600 nm. In some examples, the threads 856 are also made of a polycarbonate material and are transparent.

In some examples, the lenses 862 include an optical coating. For example, the lens 862A can include an optical coating on an outer planar surface 860 that filters the electromagnetic radiation. In some examples, the optical coating enables electromagnetic radiation having wavelengths between 900 nm and 1600 nm to pass through the sidewall of the ring lens 522. In some examples, at least one of, or both, of the emitter 526 and the receiver 528 include lenses with optical coatings.

In some examples, the lenses 825 include one or more recesses 868. For example, the lens 862A is cylindrical and includes a circumferential recess 868 located on an outer radial surface 864 of the lens 862A. The recess 868 spans the entire circumference of the lens 862A. The recess 868 is configured to receive (e.g., house) an elastomeric seal 866.

In some examples, the elastomeric seal 866 at least partially seals the lenses 862 to the sensor 852. For example, the seal 866 substantially prevents airborne particulates 562 (e.g., debris, dust, pollen, etc.) from entering from the ambient environment into an internal space of the sensor 852. As the airborne particulates 562 travel towards the internal space (e.g., by moving along one or more of the paths 870), the airborne particulates are stopped by the presence of the seals 866.

In some examples, the recesses 868 are square-shaped. For example, the recess 868 is a square-shaped o-ring groove and the seal 866 is an o-ring seal. In some examples, the recess is a gasket surface and the seal is a gasket. In some examples, other recesses and seals can be used with the sensor system 850.

In some examples, sensor system 850 includes a base 878. For example, the sensor 852 is mounted to a base 878 which is substantially similar to, or the same as, the mount 546 described with reference to FIG. 6. For example, the base 878 mechanically connects the sensor 852 to the vehicle 502 using mechanical fasteners.

In some examples, the sensor system 850 includes a mount 890 for mounting the base 520 to the vehicle 502. For example, the mount 890 can include a bracket. In some examples, the sensor system 850 includes a mount 890 located directly between the base 878 and the vehicle 502. In this example, the mount 890 provides a rigid structural connection between a structural frame of the vehicle 502 and the base 878.

In operation, the processor 530 transmits control signals to the motor 542 which causes the motor 542 to rotate the emitter 526 and receiver 528 around the longitudinal axis 540. In some examples, as the emitter 526 and receiver 528 rotate, they continuously transmit and receive electromagnetic radiation through the lenses 862. For example, the emitter 526 of the sensor 852 emits electromagnetic radiation 872 that passes through the lens 862A (e.g., from an inner planar surface 876 of the lens 862A to the outer planar surface 860 of the lens 862A). The electromagnetic radiation then reflects off of one or more objects of the environment and the reflected electromagnetic radiation 874 is received through the lens 862B and by the receiver 528. The receiver 528 generates sensor data based on the received light and transmits the sensor data to the processor 530 as described above with reference to FIG. 6.

Further non-limiting aspects or embodiments are set forth in the following numbered clauses:

Clause 1: A LIDAR system comprising: a LIDAR sensor configured to rotate about a longitudinal axis within an interchangeable ring lens and receive electromagnetic radiation, wherein a mount portion of the interchangeable ring lens comprises a threaded connection that removably couples the interchangeable ring lens to a base, the interchangeable ring lens being removable from the base by the threaded connection, wherein the base comprises an elastomeric seal for at least partially sealing the interchangeable ring lens to the base.

Clause 2: The LiDAR system of clause 1, wherein the LiDAR sensor is configured to receive electromagnetic radiation at a plurality of azimuth angles through a sidewall of the interchangeable ring lens.

Clause 3: The LiDAR system of clause 2, further comprising a processor operable to control an azimuth angle of the LiDAR sensor to be one or more of the plurality of azimuth angles and receive one or more signals from the LiDAR sensor representing the received electromagnetic radiation.

Clause 4: The LiDAR system of any of the preceding clauses, wherein the interchangeable ring lens comprises a material with at least 75% optical transmissibility at one or more wavelengths of the electromagnetic radiation.

Clause 5: The LiDAR system of any of the preceding clauses, wherein the base is cylindrical and comprises an outer radial surface comprising a groove for housing the elastomeric seal, the outer radial surface comprising one or more threads of the threaded connection.

Clause 6: The LiDAR system of clause 5, wherein the mount portion comprises an inner radial surface comprising one or more threads of the threaded connection for mating with the one or more threads of the outer radial surface.

Clause 7: The LiDAR system of clause 5, wherein the LiDAR sensor is configured to mount to the base.

Clause 8: The LiDAR system of any of the preceding clauses, wherein the interchangeable ring lens is configured to cover the base.

Clause 9: The LiDAR system of any of the preceding clauses, further comprising one or more lenses located within the interchangeable ring lens.

Clause 10: The LiDAR system of clause 9, wherein the LiDAR sensor is configured to receive electromagnetic radiation that has passed through a sidewall of the interchangeable ring lens and the one or more lenses.

Clause 11: The LiDAR system of any of the preceding clauses, wherein the base comprises a first set of one or more holes for mounting the LiDAR sensor to the base and a second set of one or more mounting holes for mounting the base to a vehicle.

Clause 12: The LiDAR system of any of the preceding clauses, wherein the interchangeable ring lens is removable from the base while the base is mounted to the vehicle.

Clause 13: A vehicle comprising: one or more LiDAR systems, each LiDAR system comprising an interchangeable ring lens and a LIDAR sensor within each respective interchangeable ring lens, wherein each interchangeable ring lens comprises a threaded portion for attaching the interchangeable ring lens to a respective base of the LiDAR system; and a processor configured to (i) receive sensor data generated by each LIDAR sensor; and (ii) transmit one or more control signals to each LiDAR sensor for controlling a respective azimuth angle of each LiDAR sensor.

Clause 14: The vehicle of clause 13, wherein each interchangeable ring lens is removable from the vehicle while the LiDAR sensor is mounted to the base.

Clause 15: The vehicle of clause 13 or clause 14, wherein each LiDAR sensor is attached to the vehicle irrespective of whether the respective interchangeable ring lenses are attached to the LIDAR sensor.

Clause 16: The vehicle of any of clauses 13-15, wherein each interchangeable ring lens is configured to at least partially seal each respective LiDAR sensor from an ambient environment.

Clause 17: The vehicle of any of clauses 13-16, wherein the one or more LIDAR systems are five LiDAR systems.

Clause 18: A vehicle comprising: a LIDAR system comprising a LIDAR sensor configured to rotate about a rotation axis within an interchangeable ring lens and receive electromagnetic radiation, wherein a mount portion of the interchangeable ring lens comprises a threaded connection that removably couples the interchangeable ring lens to a base, the interchangeable ring lens being removable from the base by the threaded connection, and a processor configured to transmit one or more control signals to the LiDAR system for controlling an azimuth angle of the LiDAR system.

Clause 19: The vehicle of clause 18, wherein the LiDAR sensor is configured to receive electromagnetic radiation at a plurality of azimuth angles through a sidewall of the interchangeable ring lens at the plurality of azimuth angles.

Clause 20: The vehicle of clause 18 or clause 19, wherein the interchangeable ring lens comprises a material with at least 75% optical transmissibility at one or more wavelengths of the electromagnetic radiation.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A LiDAR system comprising:

a LiDAR sensor comprising an internal motor rotationally affixed to a housing of the LiDAR sensor, the internal motor causing the housing of the LiDAR sensor to rotate about a longitudinal axis within an interchangeable ring lens, the LiDAR sensor configured to receive electromagnetic radiation, wherein a mount portion of the interchangeable ring lens comprises a threaded connection that removably couples the interchangeable ring lens to a base, the interchangeable ring lens being removable from the base by the threaded connection while the LiDAR sensor is mounted to the base, wherein the base comprises an elastomeric seal for at least partially sealing the interchangeable ring lens to the base.

2. The LiDAR system of claim 1, wherein the LiDAR sensor is configured to receive the electromagnetic radiation at a plurality of azimuth angles through a sidewall of the interchangeable ring lens.

3. The LiDAR system of claim 2, further comprising a processor operable to control an azimuth angle of the LiDAR sensor to be one or more of the plurality of azimuth angles and receive one or more signals from the LiDAR sensor representing the received electromagnetic radiation.

4. The LiDAR system of claim 1, wherein the interchangeable ring lens comprises a material with at least 75% optical transmissibility at one or more wavelengths of the electromagnetic radiation.

5. The LiDAR system of claim 1, wherein the base is cylindrical and comprises an outer radial surface comprising a groove for housing the elastomeric seal, the outer radial surface comprising one or more threads of the threaded connection.

6. The LiDAR system of claim 5, wherein the mount portion comprises an inner radial surface comprising one or more threads of the threaded connection for mating with the one or more threads of the outer radial surface.

7. The LiDAR system of claim 1, wherein the interchangeable ring lens is configured to cover the base.

8. The LiDAR system of claim 1, further comprising one or more lenses located within the interchangeable ring lens.

9. The LiDAR system of claim 8, wherein the LiDAR sensor is configured to receive electromagnetic radiation that has passed through a sidewall of the interchangeable ring lens and the one or more lenses.

10. The LiDAR system of claim 1, wherein the base comprises a first set of one or more holes for mounting the LiDAR sensor to the base and a second set of one or more mounting holes for mounting the base to a vehicle.

11. The LiDAR system of claim 1, wherein the interchangeable ring lens is removable from the base while the base is mounted to the vehicle.

12. A vehicle comprising:

one or more LiDAR systems, each LiDAR system comprising an interchangeable ring lens and a LiDAR sensor within each respective interchangeable ring lens, the LiDAR sensor comprising an internal motor rotationally affixed to a housing of the LiDAR sensor, the internal motor causing the housing of the LiDAR sensor to rotate about a longitudinal axis within the interchangeable ring lens, wherein each interchangeable ring lens comprises a threaded portion for attaching the interchangeable ring lens to a respective base of the LiDAR system, and wherein each interchangeable ring lens is removable from the vehicle while the LiDAR sensor is mounted to the base; and a processor configured to (i) receive sensor data generated by each LIDAR sensor; and (ii) transmit one or more control signals to each LiDAR sensor for controlling a respective azimuth angle of each LiDAR sensor.

13. The vehicle of claim 12, wherein each LiDAR sensor is attached to the vehicle irrespective of whether the respective interchangeable ring lenses are attached to the LIDAR sensor.

14. The vehicle of claim 12, wherein each interchangeable ring lens is configured to at least partially seal each respective LiDAR sensor from an ambient environment.

15. The vehicle of claim 12, wherein the one or more LiDAR systems are five LiDAR systems.

16. A vehicle comprising:

a LiDAR system comprising a LiDAR sensor configured to rotate about a rotation axis within an interchangeable ring lens and receive electromagnetic radiation, the LiDAR sensor comprising an internal motor rotationally affixed to a housing of the LiDAR sensor, the internal motor causing the housing of the LiDAR sensor to rotate about the rotation axis within the interchangeable ring lens, wherein a mount portion of the interchangeable ring lens comprises a threaded connection that removably couples the interchangeable ring lens to a base, the interchangeable ring lens being removable from the base by the threaded connection while the LiDAR sensor is mounted to the base, and a processor configured to transmit one or more control signals to the LiDAR system for controlling an azimuth angle of the LiDAR system.

17. The vehicle of claim 16, wherein the LiDAR sensor is configured to receive electromagnetic radiation at a plurality of azimuth angles through a sidewall of the interchangeable ring lens at the plurality of azimuth angles.

18. The vehicle of claim 16, wherein the interchangeable ring lens comprises a material with at least 75% optical transmissibility at one or more wavelengths of the electromagnetic radiation.

* * * * *